United States Patent
Tseng

(10) Patent No.: US 7,073,854 B2
(45) Date of Patent: Jul. 11, 2006

(54) BACK SUPPORTING DEVICE FOR A MOTOR VEHICLE SEAT

(76) Inventor: Fang-Sheng Tseng, No. 61, Ta-Fu St., San-Min Dist., Kaohsiung City (TW)

( * ) Notice: Subject to any disclaimer, the term of this patent is extended or adjusted under 35 U.S.C. 154(b) by 61 days.

(21) Appl. No.: 10/722,047

(22) Filed: Nov. 24, 2003

(65) Prior Publication Data
US 2005/0110311 A1 May 26, 2005

(51) Int. Cl.
*B62J 1/00* (2006.01)
(52) U.S. Cl. .............. 297/215.12; 297/215.11; 297/215.1; 297/353
(58) Field of Classification Search .......... 297/215.1, 297/215.11, 215.12, 353, 354.12, 354.13, 297/195.1, 195.11, 383, 344.1; 280/219, 280/304.4
See application file for complete search history.

(56) References Cited

U.S. PATENT DOCUMENTS

| 1,380,934 | A | * | 6/1921 | Speer | 297/373 |
| 3,822,917 | A | | 7/1974 | George | 297/195 |
| 4,030,750 | A | | 6/1977 | Abram | 297/375 |
| 4,032,189 | A | | 6/1977 | Benavente et al. | 297/352 |
| 4,141,587 | A | * | 2/1979 | Holcomb | 297/215.1 |
| 4,466,660 | A | * | 8/1984 | Mabie | 297/215.11 |
| 5,026,119 | A | | 6/1991 | Frank et al. | 297/383 |
| 5,441,330 | A | | 8/1995 | Rojas | 297/383 |
| 5,518,291 | A | | 5/1996 | Shaide | 297/215.12 |
| 5,544,937 | A | * | 8/1996 | Hanagan | 297/215.12 |
| 5,882,074 | A | * | 3/1999 | Kojima | 297/341 |
| 5,967,604 | A | * | 10/1999 | Yoshida et al. | 297/216.19 |
| 5,971,490 | A | * | 10/1999 | Chang | 297/473 |
| 6,036,267 | A | * | 3/2000 | Downey et al. | 297/341 |
| 6,048,030 | A | * | 4/2000 | Kanda et al. | 297/341 |
| 6,336,679 | B1 | * | 1/2002 | Smuk | 297/378.12 |

* cited by examiner

Primary Examiner—Laurie K. Cranmer
(74) Attorney, Agent, or Firm—Ladas & Parry LLP

(57) ABSTRACT

A back supporting device for a motor vehicle seat includes a pair of hollow left and right sliding rails that are disposed fixedly on two opposite sides of a passenger seat portion disposed immediately behind a driver seat portion. Two slidable elements are received respectively and movably within the left and right sliding rails. Two connecting members are connected respectively and fixedly to the slidable elements, and are disposed outwardly of the left and right sliding rails. Two supporting frames have lower ends connected respectively and pivotally to the connecting members. A backrest is retained on the supporting frames so as to permit the slidable elements to be moved forcibly within the left and right sliding rails. Preferably, the slidable elements are locked respectively and releasably within the left and right sliding rails.

14 Claims, 5 Drawing Sheets

BACK SUPPORTING DEVICE FOR A MOTOR VEHICLE SEAT

BACKGROUND OF THE INVENTION

1. Field of the Invention

This invention relates to a back supporting device for a motor vehicle seat, and more particularly to a back supporting device for a motor vehicle seat that includes a backrest which is movable on the seat.

2. Description of the Related Art

Referring to FIG. 1, a conventional motorcycle seat 1 is shown to include a driver seat portion 11, a passenger seat portion 12, a luggage frame 13, and a backrest 2 fixed on the luggage frame 13 and disposed immediately behind the passenger seat portion 12. As such, the backrest 2 cannot be used to support a driver's back.

SUMMARY OF THE INVENTION

The object of this invention is to provide a back supporting device for a motor vehicle seat that includes a backrest which is movable on the seat for supporting the back of a driver or a passenger.

According to this invention, a back supporting device for a motor vehicle seat includes a pair of hollow left and right sliding rails that are disposed fixedly on two opposite sides of a passenger seat portion disposed immediately behind a driver seat portion. Two slidable elements are received respectively and movably within the left and right sliding rails. Two connecting members are connected respectively and fixedly to the slidable elements, and are disposed outwardly of the left and right sliding rails. Two supporting frames have lower ends connected respectively and pivotally to the connecting members. A backrest is retained on the supporting frames so as to permit the slidable elements to be moved forcibly within the left and right sliding rails, thereby permitting movement of the backrest between front and rear ends of the passenger seat portion. Preferably, the slidable elements are locked respectively and releasably within the left and right sliding rails.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
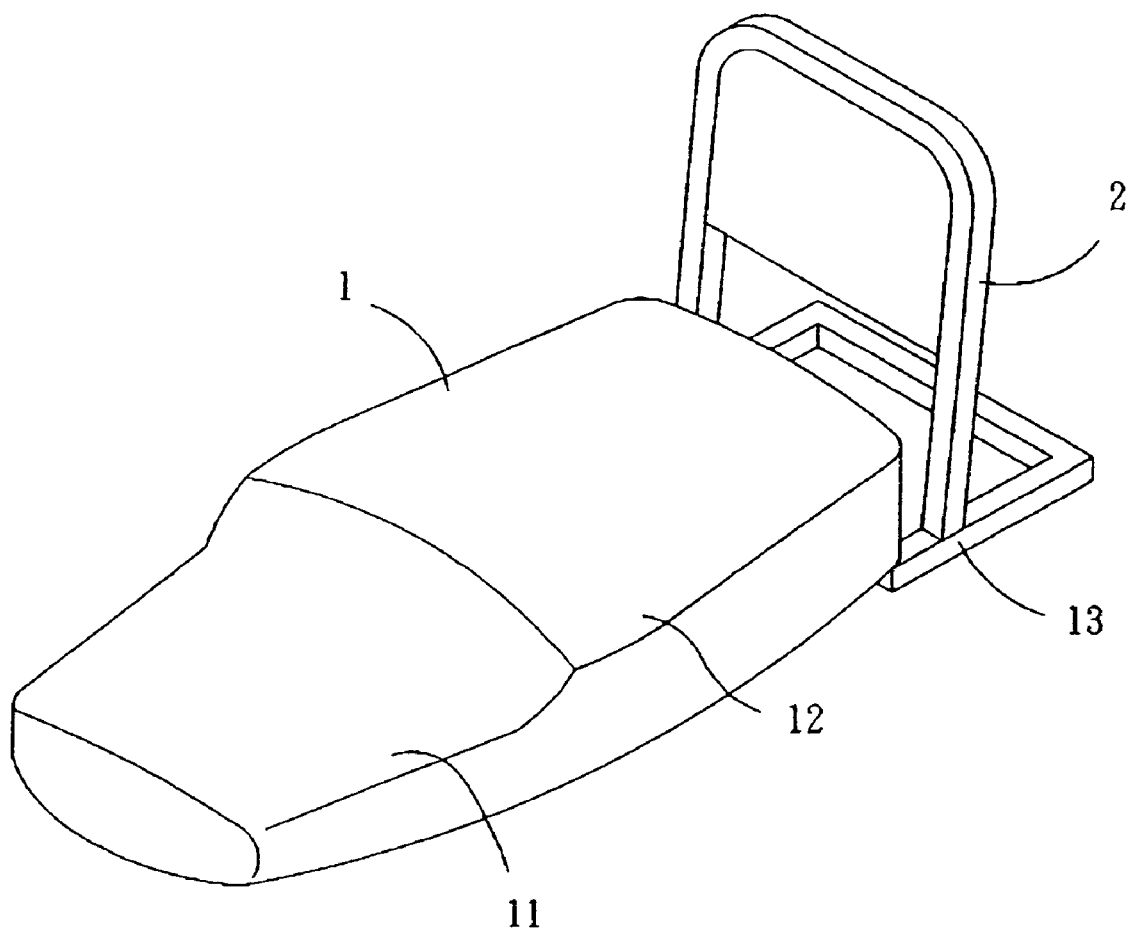
FIG. 1 is a perspective view of a conventional motorcycle seat that is provided with a fixed backrest.
Figure 2:
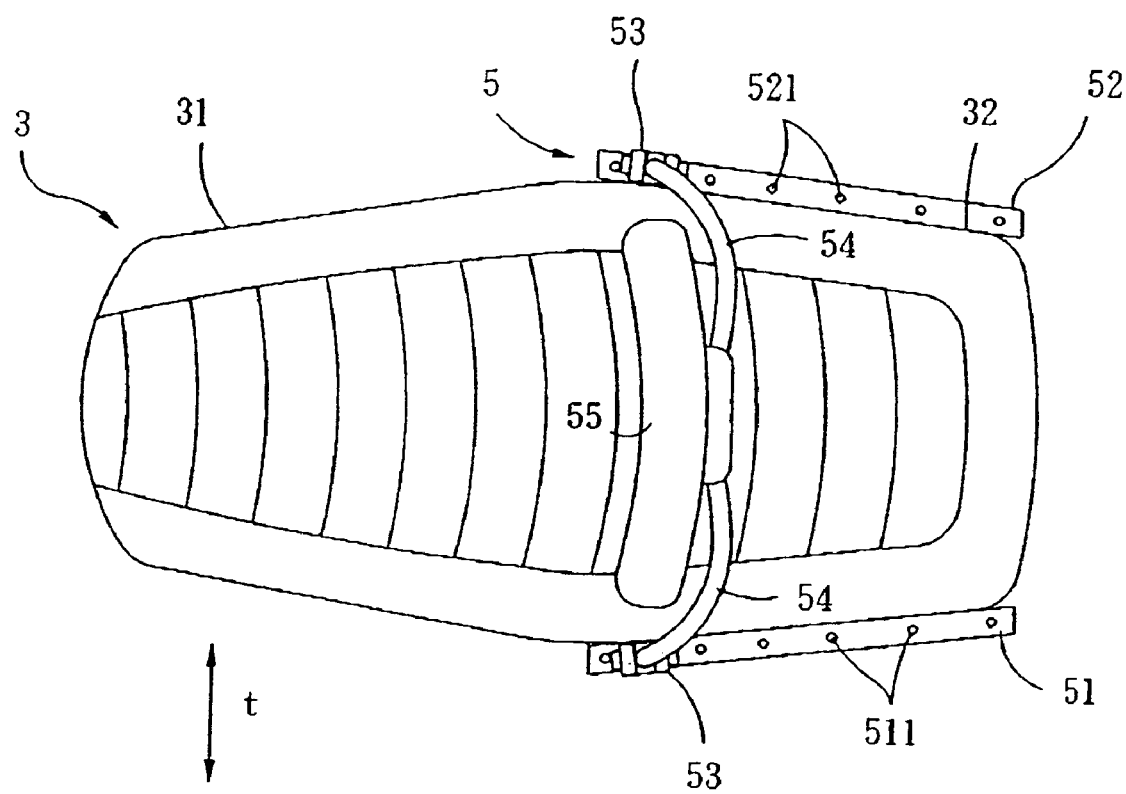
FIG. 2 is a top view of an assembly of the preferred embodiment of a back supporting device according to this invention and a motor vehicle seat.
Figure 3:
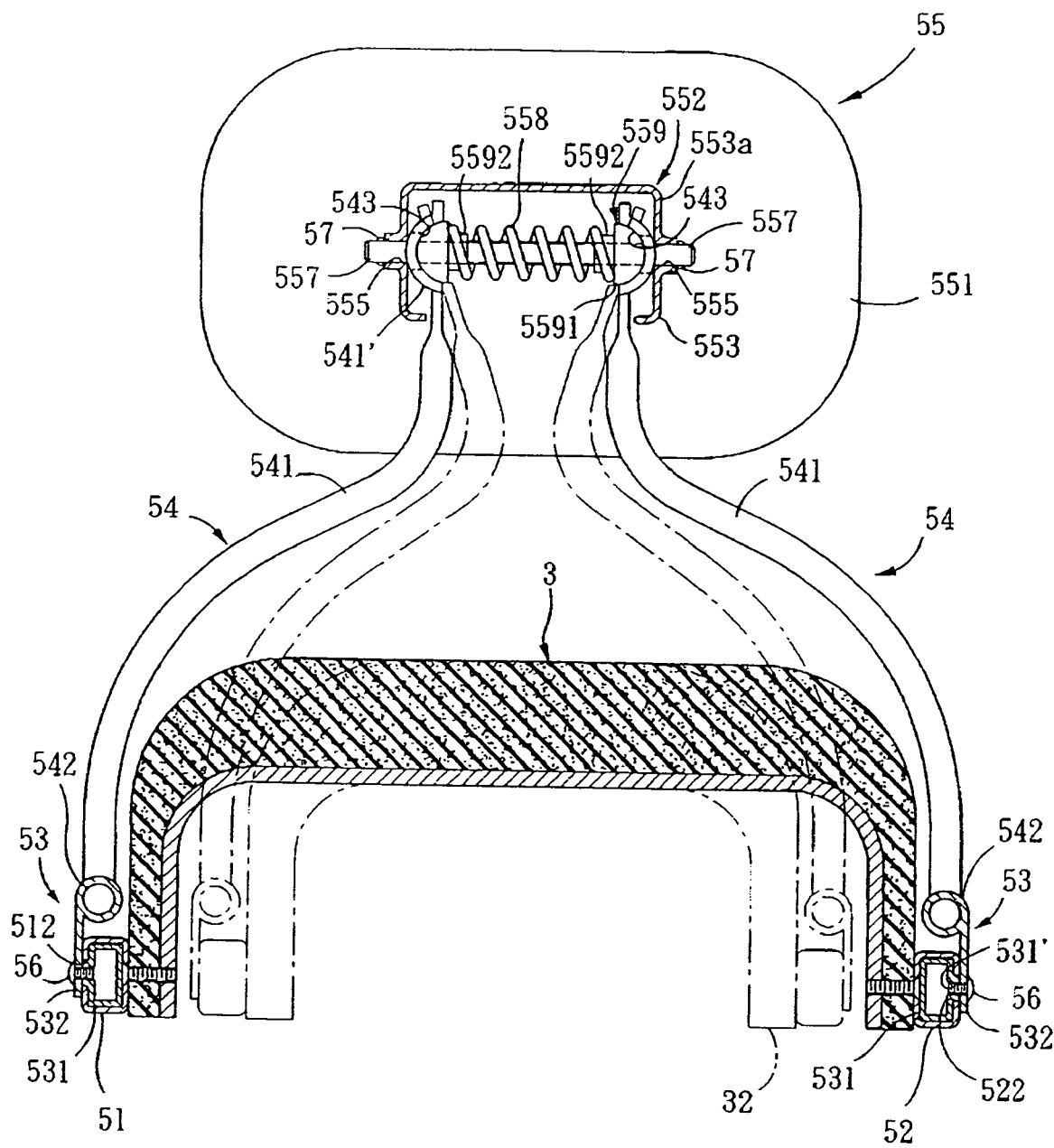
FIG. 3 is a schematic sectional view of the assembly of the preferred embodiment and the motor vehicle seat.
Figure 4:
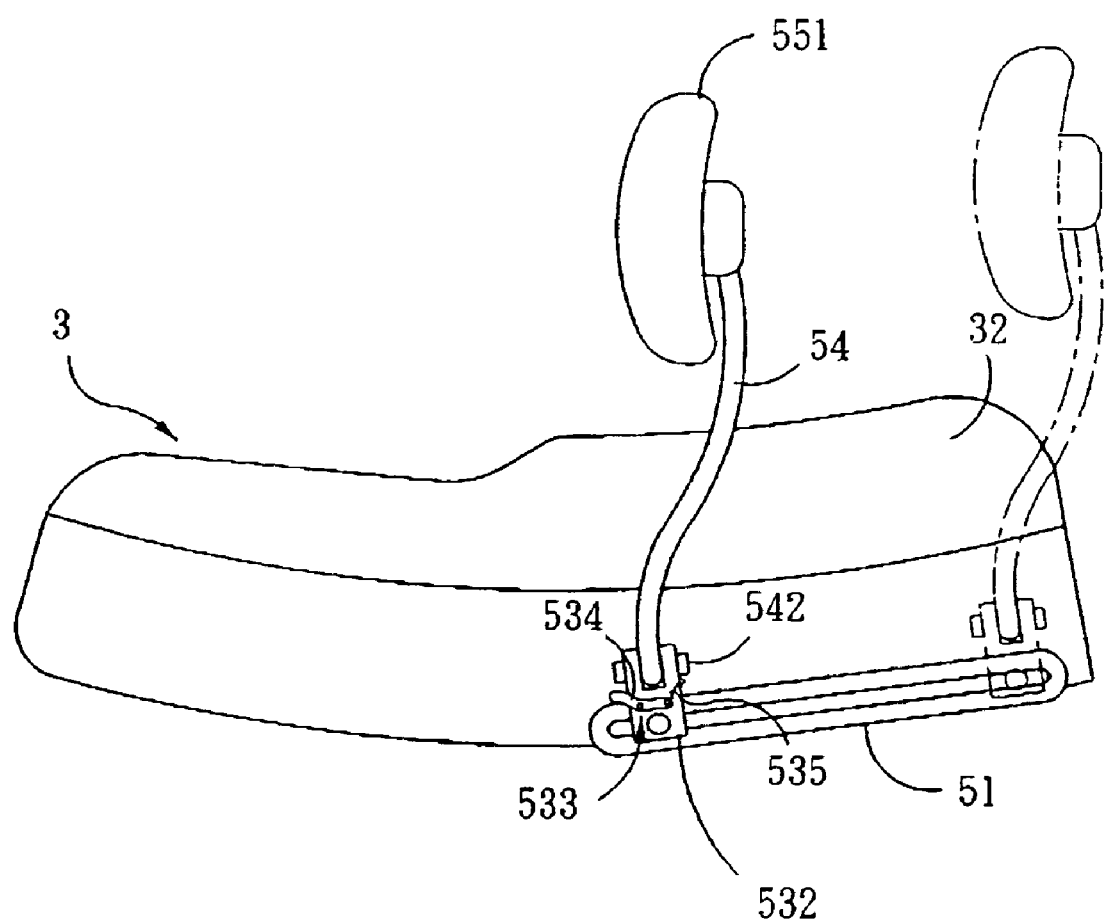
FIG. 4 is a side view of the assembly of the preferred embodiment and the motor vehicle seat, illustrating how the position of a backrest of the preferred embodiment is adjusted.

Referring to FIGS. 2, 3, and 4, the preferred embodiment of a back supporting device 5 according to this invention is shown to include a pair of hollow left and right sliding rails 51, 52, two slide units 53, two supporting frames 54, a back supporting mechanism 55, and two locking units in the form of lock bolts 56.

The back supporting device 5 is mounted on a motor vehicle seat 3 that is configured as a motorcycle seat and that has a driver seat portion 31 disposed at a front portion of the motor vehicle seat 3, and a passenger seat portion 32 disposed immediately behind the driver seat portion 31. The passenger seat portion 32 has a width that is reduced gradually from a front end thereof to a rear end thereof.

The left and right sliding rails 51, 52 are disposed respectively and fixedly on two opposite sides of the passenger seat portion 32, extend from the front end of the passenger seat portion 32 to the rear end of the passenger seat portion 32, and are spaced apart from each other by a distance along a transverse direction (t) (see FIG. 2) of the motor vehicle seat 3. The distance is reduced gradually from the front end of the passenger seat portion 32 to the rear end of the passenger seat portion 32, as shown in FIG. 2. Each of the left and right sliding rails 51, 52 has a top surface that is formed with a longitudinal row of positioning holes 511, 521, is shaped as a rectangular tube, and has an outer sidewall that is formed with a longitudinal slot 512, 522 therethrough.

Each of the slide units 53 includes a slidable element 531 received movably within a corresponding one of the left and right sliding rails 51, 52, a connecting member 532 disposed outwardly of the corresponding one of the left and right sliding rails 51, 52 and connected fixedly to the slidable element 531 by the corresponding lock bolt 56, and a positioning unit for retaining the slidable element 531 at a selected one of a plurality of positions relative to the corresponding one of the left and right sliding rails 51, 52. The slidable elements 531 are also shaped as rectangular tubes received respectively and fittingly within the left and right sliding rails 51, 52. Each of the slidable elements 531 of the slide units 53 has an outer sidewall that is formed with a threaded hole 531' therethrough. The lock bolts 56 extend respectively through the longitudinal slots 512, 522 in the left and right sliding rails 51, 52, and engage respectively the threaded holes 531' in the slidable elements 531 so as to lock the slidable elements 531 respectively and releasably within the left and right sliding rails 51, 52.

Figure 5:
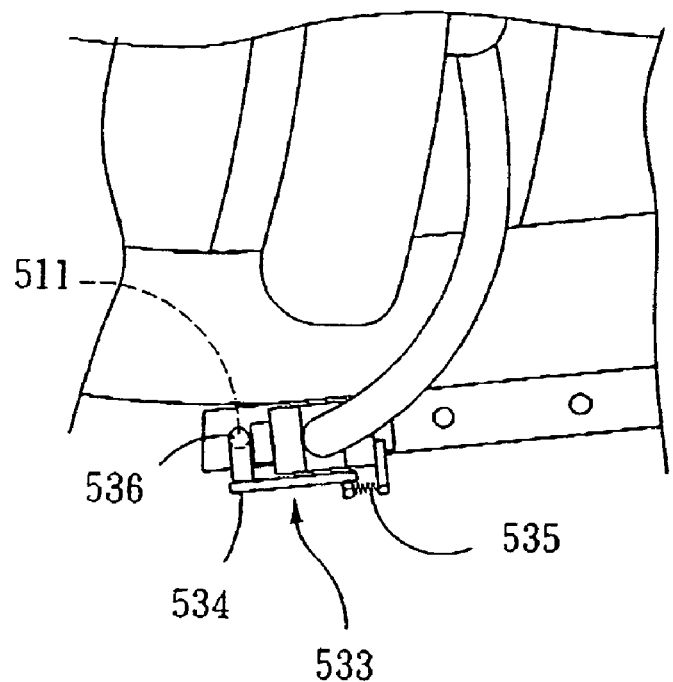
FIG. 5 is a fragmentary top view of the assembly of the preferred embodiment and the motor vehicle seat, illustrating how an insert portion of a positioning member of the preferred embodiment is brought into engagement with a selected one of a plurality of positioning holes in a top surface of a sliding rail of the preferred embodiment.
Figure 6:
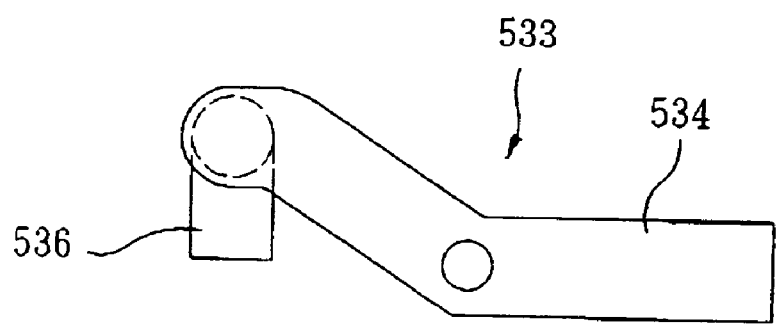
FIG. 6 is a perspective view of a positioning member of the preferred embodiment.

Each of the positioning units of the slide units 53 includes a positioning member 533 connected pivotally to the connecting member 532 of the corresponding slide unit 53, and a biasing unit that is configured as a coiled tension spring 535. Each of the positioning members 533 is shaped as a curved rod, and includes a zigzag rod portion 534 (see FIG. 6) connected pivotally to the connecting member 532 of the corresponding slide unit 53, and an insert portion 536 (see FIGS. 5 and 6) that is shaped as an L-shaped rod and that is connected fixedly to a front end of the zigzag rod portion 534. Each of the coiled tension springs 535 has a front end fastened to a rear end of the corresponding zigzag rod portion 534, and a rear end disposed above the front end of the corresponding coiled tension spring 535 and fastened to the connecting member 532 of the corresponding slide unit 53, as shown in FIG. 4. As such, the insert portions 536 of the positioning members 533 are biased by the coiled tension springs 535 to turn downwardly so as to engage respectively two selected ones of the positioning holes 511, 521 in the top surfaces of the left and right sliding rails 51, 52.

Each of the supporting frames 54 has a curved rod body 541, an inverted T-shaped lower end 542 that is formed integrally with the curved rod body 541 and that is connected pivotally to the connecting member 532 of the corresponding slide unit 53 such that upper ends of the supporting frames 54 can rotate toward and away from each other, and an upper end 541' that is C-shaped and that defines a curved groove 543. The curved grooves 543 are located between the upper ends 541' of the supporting frames 54.

The back supporting mechanism 55 includes a backrest 551 mounted to the supporting frames 54 and disposed above the passenger seat portion 32, and a frame-positioning device 552 disposed between the backrest 551 and the supporting frames 54 to position the backrest 551 on the supporting frames 54. As such, when the lock bolts 56 are loosened, the slidable elements 531 are movable respectively and forcibly within the left and right sliding rails 51, 52.

The frame-positioning device 552 includes an inverted U-shaped wall 553, a horizontal rod 557, a coiled compression spring 558, and two pressing elements 559. The inverted U-shaped wall 553 is mounted fixedly on the backrest 551, and has two parallel rod-supporting wall portions (553a). The horizontal rod 557 extends through holes 555 in the rod-supporting wall portions (553a) of the inverted U-shaped wall 553. Two retaining rings 57 are sleeved respectively and fixedly around two ends of the horizontal rod 557, and abut against the rod-supporting wall portions (553a) of the inverted U-shaped wall 553 so as to fix the horizontal rod 557 relative to the inverted U-shaped wall 553. The upper ends 541' of the supporting frames 54 are sleeved movably and rotatably on the horizontal rod 557 between the rod-supporting wall portions (553a) of the inverted U-shaped wall 553. The coiled compression spring 558 is sleeved around the horizontal rod 557 between the upper ends 541' of the supporting frames 54. Each of the pressing elements 559 is sleeved movably and rotatably around the horizontal rod 557 between the upper end 541' of the corresponding supporting frame 54 and the coiled compression spring 558, and has a semi-spherical outer portion 5591 that engages fittingly the curved groove 543 in the upper end 541' of the corresponding supporting frame 54, and a circular tubular inner portion 5592 that is formed integrally with the semi-spherical outer portion 5591. The coiled compression spring 558 has two ends that are sleeved respectively around the circular tubular inner portions 5592 of the pressing elements 559 and that press the semi-spherical outer portions 5591 of the pressing elements 559 and the upper ends 541' of the supporting frames 54 against the rod-supporting wall portions (553a) of the inverted U-shaped wall 553. As such, the upper ends 541' of the supporting frames 54 are positioned within the inverted U-shaped wall 553 such that the supporting frames 54 are movable forcibly within outer positions shown by solid lines in FIG. 3 and inner positions shown by phantom lines in FIG. 3.

With this invention thus explained, it is apparent that numerous modifications and variations can be made without departing from the scope and spirit of this invention. It is therefore intended that this invention be limited only as indicated by the appended claims.

I claim:

1. A motor vehicle seat, comprising:
   a driver seat portion disposed at a front portion of the motor vehicle seat;
   a passenger seat portion disposed immediately behind the driver seat portion, the passenger seat portion having a front end, a rear end, and a width that is reduced gradually from the front end to the rear end; and
   a back supporting device comprising:
      a pair of hollow left and right sliding rails disposed respectively and fixedly on two opposite sides of the passenger seat portion such that said left and right sliding rails extend from the front end of the passenger seat portion to the rear end of the passenger seat portion, said left and right sliding rails being spaced apart from each other by a distance along a transverse direction of the motor vehicle seat, the distance being reduced gradually from the front end of the passenger seat portion to the rear end of the passenger seat portion,
      two slide units, each of which includes a slidable element received movably within a corresponding one of said left and right sliding rails, a connecting member disposed outwardly of the corresponding one of said left and right sliding rails and connected fixedly to said slidable element, and a positioning unit for retaining said slidable element at a selected one of a plurality of positions relative to the corresponding one of said left and right sliding rails,
      two supporting frames having upper ends, and lower ends that are connected respectively and pivotally to said connecting members of said slide units such that said upper ends of said supporting frames can pivot toward and away from each other about the pivotal connection of the lower ends, and
   a back supporting mechanism including a backrest mounted to said supporting frames and disposed above the passenger seat portion, and a frame-positioning device disposed between said backrest and said supporting frames to position said backrest on said supporting frames such that said slidable elements of said slide units are movable respectively and forcibly within said left and right sliding rails.

2. The motor vehicle seat as claimed in claim 1, further comprising two locking units for locking said slidable elements respectively and releasably within said left and right sliding rails so as to fix said backrest with respect to the passenger seat portion.

3. The motor vehicle seat as claimed in claim 2, wherein each of said left and right sliding rails is shaped as a rectangular tube, and has an outer sidewall that is formed with a longitudinal slot therethrough, said slidable elements being also shaped as rectangular tubes that are received respectively and fittingly within said left and right sliding rails, each of said slidable elements having an outer sidewall that is formed with a threaded hole therethrough, said locking units being configured respectively as two lock bolts that extend respectively through said longitudinal slots in said left and right sliding rails and that engage respectively said threaded holes in said slidable elements so as to lock said slidable elements respectively and releasably within said left and right sliding rails, whereby, when said lock bolts are loosened, said slidable elements can move within said left and right sliding rails, respectively.

4. The motor vehicle seat as claimed in claim 1, wherein each of said left and right sliding rails has a top surface that is formed with a longitudinal row of positioning holes, each of said positioning units including:

a positioning member connected pivotally to a corresponding one of said connecting members of said slide units and having a fixed insert portion; and a biasing unit for biasing said insert portion of said positioning member to engage a selected one of said positioning holes in the corresponding one of said left and right sliding rails so as to retain a corresponding one of said slidable elements at the selected one of the positions relative to the corresponding one of said left and right sliding rails.

5. The motor vehicle seat as claimed in claim 4, wherein each of said positioning members is shaped as a curved rod, and further includes a zigzag rod portion connected pivotally to the corresponding one of said connecting members of said slide units, each of said insert portions of said positioning members being shaped as an L-shaped rod and being connected fixedly to an end of a corresponding one of said zigzag rod portions, each of said biasing units of said positioning units being configured as a coiled tension spring that has two ends which are fastened respectively to the other end of the corresponding one of said zigzag rod portions and the corresponding one of said connecting members of said slide units.

6. The motor vehicle seat as claimed in claim 1, wherein said frame-positioning device includes:

an inverted U-shaped wall mounted fixedly on said backrest and having two parallel rod-supporting wall portions;

a horizontal rod extending through and connected fixedly to said rod-supporting wall portions of said inverted U-shaped wall, said upper ends of said supporting frames being sleeved movably and rotatably on said horizontal rod between said rod-supporting wall portions of said inverted U-shaped wall; and a coiled compression spring sleeved around said horizontal rod between said upper ends of said supporting frames so as to press said upper ends of said supporting frames respectively against said rod-supporting wall portions of said inverted U-shaped wall.

7. The motor vehicle seat as claimed in claim 6, wherein each of said upper ends of said supporting frames is C-shaped, and defines a curved groove, said curved grooves in said upper ends being located between said upper ends of said supporting frames, said frame-positioning device further including two pressing elements, each of which is sleeved movably and rotatably around said horizontal rod between said upper end of a respective one of said supporting frames and said coiled compression spring, each of said pressing elements having a semi-spherical outer portion that engages fittingly said curved groove in said upper end of the respective one of said supporting frames, and a circular tubular inner portion that is formed integrally with said semi-spherical outer portion, said coiled compression spring having two ends that are sleeved respectively around said circular tubular inner portions of said pressing elements and that press respectively against said semi-spherical outer portions of said pressing elements.

8. A motor vehicle seat, comprising:

a seat portion, the seat portion having a front end, a rear end, and a width that is reduced gradually from the front end to the rear end; and a back supporting device comprising:

a pair of hollow left and right sliding rails disposed respectively and fixedly on two opposite sides of the seat portion such that said left and right sliding rails extend from the front end of the seat portion to the rear end of the seat portion, said left and right sliding rails being spaced apart from each other by a distance along a transverse direction of the seat portion, the distance being reduced gradually from the front end of the seat portion to the rear end of the seat portion, two slide units, each of which includes a slidable element received movably within a corresponding one of said left and right sliding rails, a connecting member disposed outwardly of the corresponding one of said left and right sliding rails and connected fixedly to said slidable element, and a positioning unit for retaining said slidable element at a selected one of a plurality of positions relative to the corresponding one of said left and right sliding rails, two supporting frames having upper ends, and lower ends that are connected respectively and pivotally to said connecting members of said slide units such that said upper ends of said supporting frames can pivot toward and away from each other about the pivotal connection of the lower ends, and a back supporting mechanism including a backrest mounted to said supporting frames and disposed above the seat portion, and a frame-positioning device disposed between said backrest and said supporting frames to position said backrest on said supporting frames such that said slidable elements of said slide units are movable respectively and forcibly within said left and right sliding rails.

9. The motor vehicle seat as claimed in claim 8, further comprising two locking units for locking said slidable elements respectively and releasably within said left and right sliding rails so as to fix said backrest with respect to the seat portion.

10. The motor vehicle seat as claimed in claim 9, wherein each of said left and right sliding rails is shaped as a rectangular tube, and has an outer sidewall that is formed with a longitudinal slot therethrough, said slidable elements being also shaped as rectangular tubes that are received respectively and fittingly within said left and right sliding rails, each of said slidable elements having an outer sidewall that is formed with a threaded hole therethrough, said locking units being configured respectively as two lock bolts that extend respectively through said longitudinal slots in said left and right sliding rails and that engage respectively said threaded holes in said slidable elements so as to lock said slidable elements respectively and releasably within said left and right sliding rails, whereby, when said lock bolts are loosened, said slidable elements can move within said left and right sliding rails, respectively.

11. The motor vehicle seat as claimed in claim 8, wherein each of said left and right sliding rails has a top surface that is formed with a longitudinal row of positioning holes, each of said positioning units including:

a positioning member connected pivotally to a corresponding one of said connecting members of said slide units and having a fixed insert portion; and a biasing unit for biasing said insert portion of said positioning member to engage a selected one of said positioning holes in the corresponding one of said left and right sliding rails so as to retain a corresponding one of said slidable elements at the selected one of the positions relative to the corresponding one of said left and right sliding rails.

12. The motor vehicle seat as claimed in claim 11, wherein each of said positioning members is shaped as a curved rod, and further includes a zigzag rod portion connected pivotally to the corresponding one of said connecting members of said slide units, each of said insert portions of said positioning members being shaped as an L-shaped rod and being connected fixedly to an end of a corresponding one of said zigzag rod portions, each of said biasing units of said positioning units being configured as a coiled tension spring that has two ends which are fastened respectively to the other end of the corresponding one of said zigzag rod portions and the corresponding one of said connecting members of said slide units.

13. The motor vehicle seat as claimed in claim 8, wherein said frame-positioning device includes:

an inverted U-shaped wall mounted fixedly on said backrest and having two parallel rod-supporting wall portions;

a horizontal rod extending through and connected fixedly to said rod-supporting wall portions of said inverted U-shaped wall, said upper ends of said supporting frames being sleeved movably and rotatably on said horizontal rod between said rod-supporting wall portions of said inverted U-shaped wall; and a coiled compression spring sleeved around said horizontal rod between said upper ends of said supporting frames so as to press said upper ends of said supporting frames respectively against said rod-supporting wall portions of said inverted U-shaped wall.

14. The motor vehicle seat as claimed in claim 13, wherein each of said upper ends of said supporting frames is C-shaped, and defines a curved groove, said curved grooves in said upper ends being located between said upper ends of said supporting frames, said frame-positioning device further including two pressing elements, each of which is sleeved movably and rotatably around said horizontal rod between said upper end of a respective one of said supporting frames and said coiled compression spring, each of said pressing elements having a semi-spherical outer portion that engages fittingly said curved groove in said upper end of the respective one of said supporting frames, and a circular tubular inner portion that is formed integrally with said semi-spherical outer portion, said coiled compression spring having two ends that are sleeved respectively around said circular tubular inner portions of said pressing elements and that press respectively against said semi-spherical outer portions of said pressing elements.

* * * * *